3,829,466
PERFLUOROALKANESULPHONAMIDES
Adolf Staffe, Opladen, and Klaus Gerlach, Cologne, Germany, assignors to Bayer Aktiengesellschaft, Leverkusen, Germany
No Drawing. Filed Oct. 26, 1972, Ser. No. 300,892
Claims priority, application Germany, Oct. 26, 1971,
P 21 53 270.7
Int. Cl. C07c 143/74
U.S. Cl. 260—481 R    21 Claims

ABSTRACT OF THE DISCLOSURE

Perfluoroalkanesulphonamides of the formula

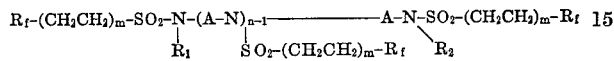

in which $R_f$, A, $R_1$, $R_2$, n and m have the meaning given in the disclosure below, a process for their manufacture and their use as oleophobic agents.

---

The invention relates to perfluoroalkanesulphonamides; more particularly it concerns perfluoroalkanesulphonamides of the formula

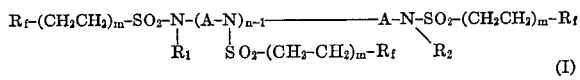

in which $R_f$ represents a perfluoroinated alkyl radical, preferably a perfluorobutyl radical,
A denotes an alkylene group which is optionally interrupted by oxygen or sulphur atoms,
$R_1$ and $R_2$ independently of one another represent hydrogen or an optionally substituted alkyl group,
n represents a number from 1 to 4 and
m is 1 or preferably 0, a process for their manufacture, and their use as oleophobic agents.

For $R_f$, perfluoroalkyl radicals to be mentioned are especially $C_3$–$C_{14}$-perfluoroalkyl radicals, for example the n-$C_3F_7$-, n-$C_4F_9$-, n-$C_6F_{13}$-, n-$C_8F_{17}$-, iso-$C_8F_{17}$-, n-$C_{10}F_{21}$-, iso-$C_{10}F_{21}$- and n-$C_{12}F_{25}$- radical.

Possible alkylene groups A are above all alkylene radicals with 2 to 10, preferably 2 or 3, C atoms, for example the —$CH_2CH_2$—,

—$CH_2CH_2CH_2$—, —$(CH_2)_4$—, —$(CH_2)_6$—,
—$(CH_2)_3$—O—$(CH_2)_3$— and —$(CH_2)_2$—S—$(CH_2)_2$— group.

As examples of optionally substituted alkyl groups which $R_1$ and $R_2$ can be, there may be mentioned: lower alkyl radicals, for example $C_1$–$C_4$-alkyl radicals, such as the methyl, ethyl, n-propyl, n-butyl and sec.-butyl radical and substituted $C_1$–$C_8$-alkyl radicals, for example $C_1$–$C_8$-alkyl radicals substituted by hydroxyl, lower alkoxy, nitrile or $C_1$–$C_6$-acyloxy groups, such as the $CH_3$—O—$CH_2CH_2$—, $CH_3$—O—$CH_2$—$CH_2CH_2$—,
$C_2H_5$—O—$CH_2$—$CH_2$—, $C_2H_5$—O—$CH_2CH_2CH_2$—, HO—$CH_2CH_2$—,
HO—$CH_2CH_2CH_2$—, HO—$CH_2CH_2CH_2CH_2$—, HO($CH_2)_8$—,
HO—$CH(CH_3)$—$CH_2$—, CN—$CH_2$—$CH_2$—, $CH_3CO$—O—$CH_2CH_2$—,
$CH_2$=CH—CO—O—$CH_2CH_2$—, $CH_2$=C—CO—O—$CH_2CH_2$—,
                                                                 $CH_3$ —$CH_2$=CH—CO—O—$CH_2CH_2CH_2$—, $CH_2$=C—CO—O—$CH_2CH_2CH_2$—,
                                                                 $CH_3$ $CH_2$=CH—CO—O—$(CH_2)_8$—, $CH_2$=C—CO—O—$(CH_2)_8$—,
                                                               $CH_3$ —$CH_2CH_2$—O—CO—CH=CH—CO—O—$CH_2CH_2$— and
—$(CH_2)_3$—O—CO—$(CH_2)_3$—CO—O—$(CH_2)_3$— radical.

Amongst the perfluoroalkanesulphonamides according to the invention, of the formula I, the following compounds are particularly preferred:

(A) The perfluoroalkanesulphonamides of the formula I, if, in this, $R_1$ represents hydrogen and $R_2$ represents hydrogen or another alkyl group.
(B) The perfluoroalkanesulphonamides of the formula I, if, in this, $R_1$ and $R_2$ independently of one another represent an optionally substituted alkyl group.

The compounds according to the invention are obtained by reaction of amines of the formula

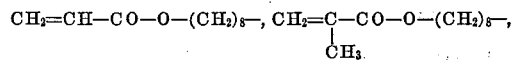

in which

A and n have the meaning indicated under formula I and $R_1$ and $R_2$ independently of one another represent hydrogen or a lower alkyl group, with perfluoroalkanesulphonyl halides of the formula $$R_f\text{—}(CH_2\text{—}CH_2)_m\text{—}SO_2\text{—}X \qquad (III)$$

in which

X represents chlorine or preferably fluorine and
$R_f$ and m have the meaning indicated under the formula I.

The reaction is carried out at temperatures of 0 to 150° C., preferably 40 to 90° C., in the presence of acid-binding agents, such as inorganic bases, for example, potassium carbonate, or organic bases, for example tertiary amines, such as triethylamine or pyridine or alcoholates, such as sodium methylate, optionally in organic solvents which are inert under the reaction conditions. The molar ratio of the polyamine of the formula (II) which is to be reacted and of the perfluoroalkanesulphonyl halide (III) is so chosen that about one mol of sulphonyl halide is present per mol of amino group to be reacted.

In order to manufacture the perfluoroalkanesulphonamides of the formula I in which $R_1$ and/or $R_2$ represent a substituted alkyl group, the perfluoroalkanesulphonamides obtained in the reaction are alkylated in a manner which is in itself known with substituted alkyl compounds, for example alkyl compounds substituted by hydroxyl, lower alkoxy or acyloxy groups, such as chlorohydrin, epichlorohydrin, glycol carbonates or β-acetoxyethyl chloride, β-propionyloxyethyl chloride, β-acryloyloxyethyl chloride, or β-methacryloyloxyethyl chloride.

The perfluoroalkanesulphonamides substituted by ω-acyloxyalkyl groups are also obtainable in a simple manner by acylation of the corresponding perfluoroalkanesulphonamides substituted by ω-hydroxyalkyl groups.

As examples of representatives of the compounds according to the invention, of the formula I there may be mentioned:

$R_f SO_2NHCH_2CH_2NH SO_2R_f$ $R_f = C_4F_9$, $C_6F_{13}$, $C_8F_{17}$, $C_{10}F_{21}$, $C_4F_9CH_2CH_2$—, $C_8F_{17}CH_2CH_2$—

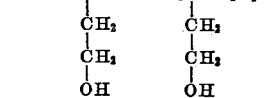

$R_f = C_4F_9$, $C_8F_{17}$, $C_4F_9CH_2CH_2$—, $C_8F_{17}CH_2CH_2$—

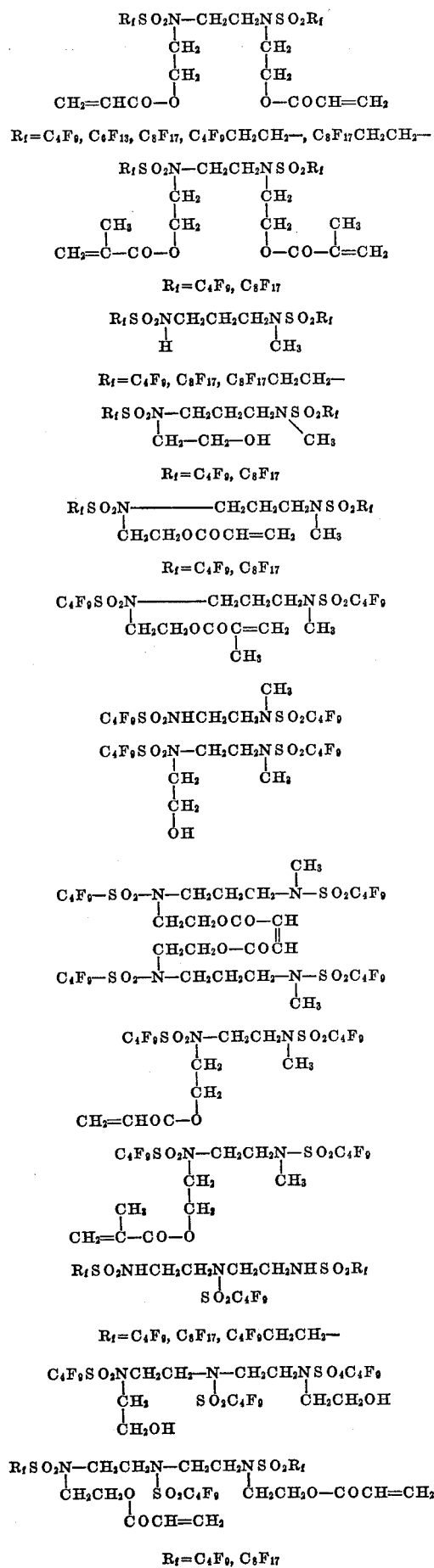
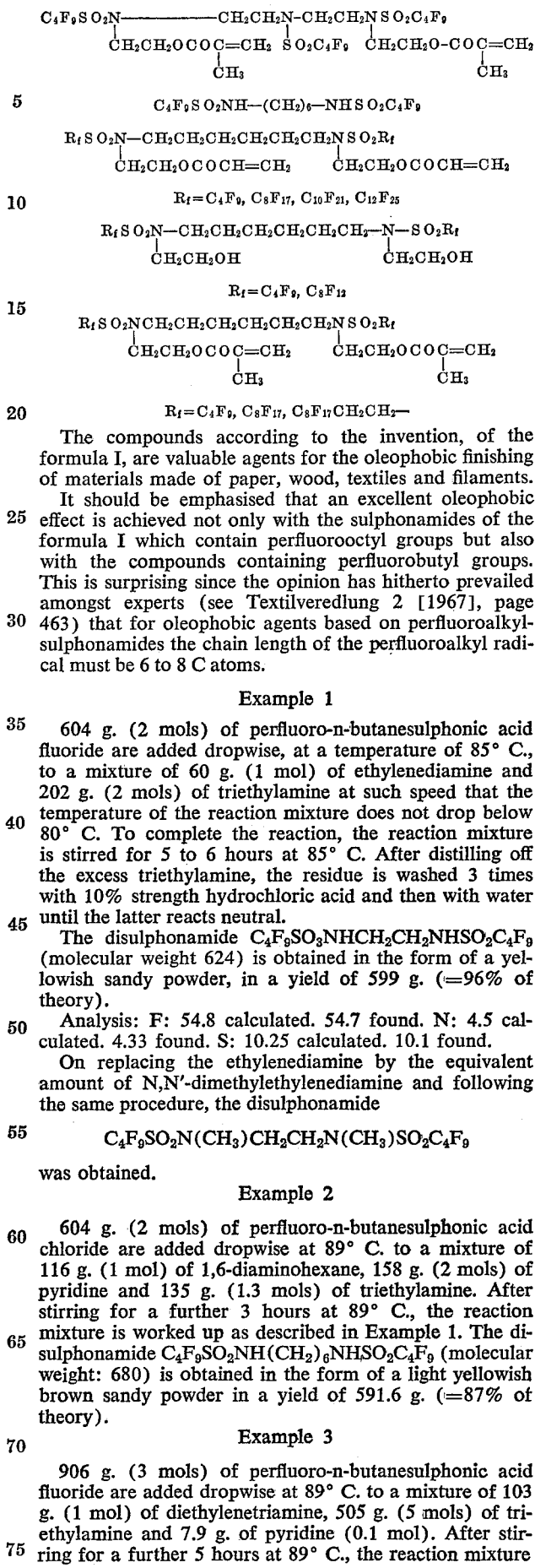

The compounds according to the invention, of the formula I, are valuable agents for the oleophobic finishing of materials made of paper, wood, textiles and filaments.

It should be emphasised that an excellent oleophobic effect is achieved not only with the sulphonamides of the formula I which contain perfluorooctyl groups but also with the compounds containing perfluorobutyl groups. This is surprising since the opinion has hitherto prevailed amongst experts (see Textilveredlung 2 [1967], page 463) that for oleophobic agents based on perfluoroalkyl-sulphonamides the chain length of the perfluoroalkyl radical must be 6 to 8 C atoms.

Example 1

604 g. (2 mols) of perfluoro-n-butanesulphonic acid fluoride are added dropwise, at a temperature of 85° C., to a mixture of 60 g. (1 mol) of ethylenediamine and 202 g. (2 mols) of triethylamine at such speed that the temperature of the reaction mixture does not drop below 80° C. To complete the reaction, the reaction mixture is stirred for 5 to 6 hours at 85° C. After distilling off the excess triethylamine, the residue is washed 3 times with 10% strength hydrochloric acid and then with water until the latter reacts neutral.

The disulphonamide $C_4F_9SO_3NHCH_2CH_2NHSO_2C_4F_9$ (molecular weight 624) is obtained in the form of a yellowish sandy powder, in a yield of 599 g. (=96% of theory).

Analysis: F: 54.8 calculated. 54.7 found. N: 4.5 calculated. 4.33 found. S: 10.25 calculated. 10.1 found.

On replacing the ethylenediamine by the equivalent amount of N,N'-dimethylethylenediamine and following the same procedure, the disulphonamide $$C_4F_9SO_2N(CH_3)CH_2CH_2N(CH_3)SO_2C_4F_9$$

was obtained.

Example 2

604 g. (2 mols) of perfluoro-n-butanesulphonic acid chloride are added dropwise at 89° C. to a mixture of 116 g. (1 mol) of 1,6-diaminohexane, 158 g. (2 mols) of pyridine and 135 g. (1.3 mols) of triethylamine. After stirring for a further 3 hours at 89° C., the reaction mixture is worked up as described in Example 1. The disulphonamide $C_4F_9SO_2NH(CH_2)_6NHSO_2C_4F_9$ (molecular weight: 680) is obtained in the form of a light yellowish brown sandy powder in a yield of 591.6 g. (=87% of theory).

Example 3

906 g. (3 mols) of perfluoro-n-butanesulphonic acid fluoride are added dropwise at 89° C. to a mixture of 103 g. (1 mol) of diethylenetriamine, 505 g. (5 mols) of triethylamine and 7.9 g. of pyridine (0.1 mol). After stirring for a further 5 hours at 89° C., the reaction mixture is worked up as described in Example 1. The trisulphonamide.

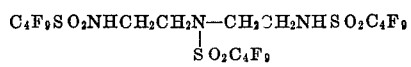

(molecular weight: 949) is obtained in the form of a light brownish sandy powder in a yield of 750 g. (=79% of theory).

Example 4

604 g. (2 mols) of perfluoro-n-butanesulphonic acid fluoride are added dropwise at 89° C. to a mixture of 88 g. (1 mol) of 3-amino-1-methylaminopropane and 303 g. (3 mols) of triethylamine. After stirring for a further 3 hours at 89° C., the reaction mixture is worked up as described in Example 1. The disulphonamide $$C_4F_9SO_2NH-CH_2CH_2CH_2N-SO_2C_4F_9$$
$$|$$
$$CH_3$$

(molecular weight: 652) is obtained in the form of a yellowish sandy powder in a yield of 556 g. (=89% of theory).

Example 5

251 g. (0.5 mol) of perfluoro-n-octanesulphonic acid fluoride are slowly added dropwise at 85° C. to a mixture of 15 g. of ethylenediamine (0.25 mol), 202 g. (2 mols) of triethylamine and 39 g. (0.5 mol) of pyridine. After stirring for a further 4 hours at 85° C., the reaction mixture is worked up as described in Example 1. The disulphonamide $C_8F_{17}SO_2NHCH_2CH_2NHSO_2C_8F_{17}$ (molecular weight: 1024) is obtained in the form of a yellowish sandy powder in a yield of 215 g. (=84% of theory).

Example 6

251 (0.5 mol) of perfluoro-n-octanesulphonic acid fluoride are slowly added dropwise at 85° C. to a mixture of 22 g. (0.25 mol) of 3-amino-1-methylaminopropane, 202 g. (2 mols) of triethylamine and 39 g. (0.5 mol) of pyridine. After stirring for a further 8 hours at 85° C. the reaction mixture is worked up as described in Example 1. The disulphonamide $$C_8F_{17}SO_2NHCH_2CH_2CH_2N-SO_2C_8F_{17}$$
$$|$$
$$CH_3$$

(molecular weight: 1052) is obtained in the form of a slightly sticky powder, in a yield of 726 g. (=79% of theory).

Example 7

624 g. (1 mol) of $C_4F_9SO_2NHCH_2CH_2NHSO_2C_4F_9$ are dissolved in 800 ml. of absolute methanol. The solution is mixed with 137.5 g. (2.5 mols) of sodium methylate and 162 g. (2 mols) of ethylene-chlorohydrin and the whole is stirred for 3 hours at 67° C. The unreacted ethylene-chlorohydrin is then distilled off under reduced pressure and the residue is stirred for 1 hour with diethyl ether at 35° C. The ether phase is separated off and washed alternately with water and with 2% strength sodium hydroxide solution. After distilling off the ether, the N,N'-di-alkylated perfluorobutylsulphonamide is left in the form of a yellowish, coarse-grained, sightly smeary solid.
Yield of

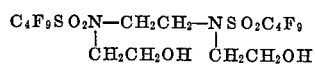

(molecular weight: 712): 619 g. (=87% of theory).
In the same manner, the reaction (a) of 1 mol of the disulphonamide described in Example 4 with 1 mol of ethylene-chlorohydrin gave N-methyl-N'-(2 - hydroxyethyl)-N,N'-di-perfluorobutane-sulphonyl-ethylenediamine

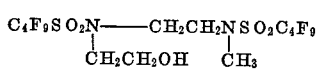

(b) of 1 mol of the disulphonamide described in Example 6 with 1 mol of ethylene-chlorohydrin gave N-methyl-N'-(2 - hydroxyethyl)-N,N'-di-perfluorooctanesulpho-nyl-propylenediamine

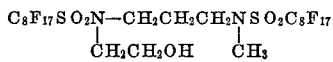

Example 8:

619 g. (0.87 mol) of

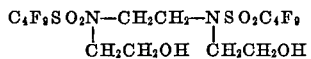

are dissolved in boiling benzene. After adding 5 ml. of concentrated $H_2SO_4$ and 130 g. of acrylic acid the reaction mixture is heated to the boil until the water formed during the esterification has quantitatively been distilled off azeotropically. After cooling, the reaction mixture is neutralised with sodium hydroxide solution and filtered. The solvent is distilled from the filtrate under reduced pressure. The diacrylic acid ester is left in the form of a slightly yellowish soapy solid in a yield of 642 g. (=90% of theory).

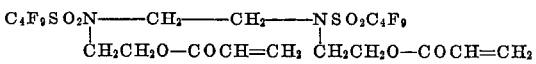

(molecular weight: 820)
In the same manner, esterification (a) of 1 mol of the N - methyl-N'-(2-hydoxyethyl)-N,N' - diperfluorobutanesulphonyl - ethylenediamine described in Example 7a and 1 mol of acrylic acid gave N-methyl-N'-(2 - acryloyloxy-ethyl) - N,N'-di - perfluorobutanesulphonyl- ethylenediamine

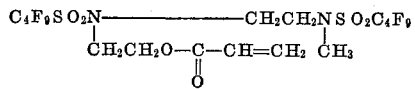

(b) of 1 mol of the N-methyl-N'-(2-hydroxyethyl)-N,N' - diperfluorooctanesulphonyl - propylenediamine described in Example 7b and 1 mol of acrylic acid gave N-methyl-N'-(2-acryloyloxy-ethyl) - N,N'-di-perfluoroctanesulphonyl-propylenediamine

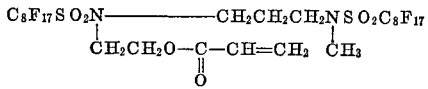

Example 9

624 g. (1 mol) of $C_4F_9SO_2NHCH_2CH_2NHSO_2C_4F_9$ are dissolved in 800 ml. of absolute methanol. After adding 115.5 g. (2.1 mols) of sodium methylate, the solution is stirred for 4 hours at 67° C. Thereafter the solvent is distilled off. The residue is treated with 295 g. (2.2 mols) of $ClCH_2CH_2OCOCH=CH_2$ and the mixture is stirred for 9 hours at 90° C. A product which is identical with that described in Example 8 is obtained.

Example 10

125.5 (0.25 mol) of perfluoro - n - octanesulphofluoride are slowly added dropwise, at 85° C, to a mixture of 22 g. (0.25 mol) of 3 - amino - 1 - methylaminopropane, 202 g. (2 mols) of triethylamine and 39 g. (0.5 mol) of pyridine. After stirring for a further 3 hours at 85° C., 75.5 g. (0.25 mol) of perfluoro-n-butanesulphofluoride are slowly added dropwise at the same temperature. After stirring for a further 6 hours at 85° C., the reaction mixture is worked up as described in Example 1. The disulphonamide

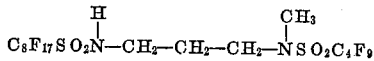

is obtained.

Example 11

Cotton is impregnated with a 1% strength solution of the perfluoroalkanesulphonamide described in Example 7, in acetone, squeezed out to a weight increase of 80% and dried for 10 minutes at 100° C. In the 3 M-test, this fabric (deposit of oleophobic agent: 0.8% by weight) receives a rating of 100.

If instead of the 1% strength solution of the compound described in Example 7 an 0.5% strength solution of the perfluoroalkanesulphonamide described in Example 8 in acetone was used and the fabric (a) was squeezed out to a weight increase of 60% and (b) in another experiment the fabric was squeezed out to a weight increase of 100%, fabrics were obtained which in the 3-M test received the following ratings:

(a) (0.3% deposit) Rating 90 to 100
(b) (0.5% deposit) Rating 100

Additionally, the 1% strength solutions in acetone of the compounds described in Example 7 and 8 were used for impregnating filter paper and timber. The oleophobic effect achieved on these materials was given the rating 120.

The oil-repellent effect of the fabric, paper and timber products described was assessed in accordance with the so-called "3M oil repellency test" (Crajeck, Petersen, Textile Research Journal 32, pages 320 to 331 (1960)) using heptane-paraffin oil mixtures. In the assessment, 150 denotes the best achievable rating and 50 the worst rating. The various samples were assessed immediately after drying.

What is claimed is:

1. Perfluoroalkanesulphonamide of the formula $$R_f\text{-}(CH_2CH_2)_m\text{-}SO_2\text{-}N\text{-}(A\text{-}N)_{n-1}\text{---}A\text{-}N\text{-}SO_2\text{-}(CH_2CH_2)_m\text{-}R_f$$
$$\quad\quad\quad\quad\quad\quad |\quad\quad\quad\quad\quad\quad\quad\quad\quad\quad\quad |$$
$$\quad\quad\quad\quad\quad\quad R_1\quad\ SO_2\text{-}(CH_2CH_2)_m\text{-}R_f\ R_2$$

in which $R_f$ is $C_3$–$C_{14}$-perfluorinated alkyl;
A is $C_2$–$C_{10}$-alkylene; $C_2$–$C_{10}$-alkylene interrupted by oxygen; or $C_2$–$C_{10}$-alkylene interrupted by sulphur;
$R_1$ and $R_2$ independently of one another are hydrogen; $C_1$–$C_4$-alkyl; or $C_1$–$C_8$-alkyl substituted by hydroxyl, lower alkoxy, nitrile or alkyl carbonyl oxy or alkenyl carbonyl oxy having 1 to 6 carbon atoms;
$n$ is a number from 1 to 4; and
$m$ is 0 or 1.

2. Perfluoroalkanesulphonamide of Claim 1, in which $R_1$ is hydrogen; and $R_2$ is hydrogen or $C_1$–$C_4$-alkyl.

3. Perfluoroalkanesulphonamide of Claim 1, in which $R_1$ and $R_2$ independently of one another are $C_1$–$C_8$-alkyl substituted by hydroxyl, lower alkoxy, nitrile, or alkyl carbonyl oxy or alkenyl carbonyl oxy having 1 to 6 carbon atoms.

4. Perfluoroalkanesulphonamide of Claim 1 in which $R_f$ is perfluorobutyl; and $m$ is 0.

5. Perfluoroalkanesulphonamide of Claim 1 in which $R_f$ is perfluorobutyl; $m$ is 0; and A is $C_2$–$C_3$-alkylene.

6. Perfluoroalkanesulphonamide of Claim 1 selected from the group consisting of $$R_fSO_2NHCH_2CH_2NHSO_2R_f$$

in which $R_f$ is $C_4F_9$, $C_6F_{13}$, $C_8F_{17}$, $C_{10}F_{21}$, $C_4F_9CH_2CH_2$—, or $C_8F_{17}CH_2CH_2$—;

$$R_fSO_2N\text{-}CH_2CH_2NSO_2R_f$$
$$\quad\quad\ |\quad\quad\quad\quad\quad\quad\ |$$
$$\quad\quad CH_2\quad\quad\quad\quad CH_2$$
$$\quad\quad\ |\quad\quad\quad\quad\quad\quad\ |$$
$$\quad\quad CH_2\quad\quad\quad\quad CH_2$$
$$\quad\quad\ |\quad\quad\quad\quad\quad\quad\ |$$
$$\quad\quad OH\quad\quad\quad\quad\ OH$$

in which $R_f$ is $C_4F_9$, $C_8F_{17}$, $C_4F_9CH_2CH_2$—, or $C_8F_{17}CH_2CH_2$—;

$$R_fSO_2N\text{-}CH_2CH_2NSO_2R_f$$
$$\quad\quad\ |\quad\quad\quad\quad\quad\quad\ |$$
$$\quad\quad CH_2\quad\quad\quad\quad CH_2$$
$$\quad\quad\ |\quad\quad\quad\quad\quad\quad\ |$$
$$\quad\quad CH_2\quad\quad\quad\quad CH_2$$
$$CH_2=CHCO\text{-}O\quad\quad\ O\text{-}COCH=CH_2$$

in which $R_f$ is $C_4F_9$, $C_8F_{17}$, $C_4F_9CH_2CH_2$—, or $C_8F_{17}CH_2CH_2$—;

$$R_fSO_2N\text{-}CH_2CH_2NSO_2R_f$$
$$\quad\quad\ |\quad\quad\quad\quad\quad\quad\ |$$
$$\quad\quad CH_2\quad\quad\quad\quad CH_2$$
$$\quad\quad\ |\quad\quad\quad\quad\quad\quad\ |$$
$$CH_3\ CH_2\quad\quad\quad CH_2\ CH_3$$
$$\ |\quad\ |\quad\quad\quad\quad\quad\ |\quad\ |$$
$$CH_2=C\text{-}CO\text{-}O\quad\quad\ O\text{-}CO\text{-}C=CH_2$$

in which $R_f$ is $C_4F_9$ or $C_8F_{17}$;

$$R_fSO_2NCH_2CH_2CH_2NSO_2R_f$$
$$\quad\quad |\quad\quad\quad\quad\quad\quad\quad\ |$$
$$\quad\quad H\quad\quad\quad\quad\quad\quad CH_3$$

in which $R_f$ is $C_4F_9$, $C_8F_{17}$ or $C_8F_{17}CH_2CH_2$—;

$$R_fSO_2N\text{-}CH_2CH_2CH_2NSO_2R_f$$
$$\quad\quad\ |\quad\quad\quad\quad\quad\quad\quad\quad\ |$$
$$\quad CH_2\text{-}CH_2\text{-}OH\quad\quad CH_3$$

in which $R_f$ is $C_4F_9$ or $C_8F_{17}$;

$$R_fSO_2N\text{---}CH_2CH_2CH_2NSO_2R_f$$
$$\quad\quad\ |\quad\quad\quad\quad\quad\quad\quad\quad\ |$$
$$\quad CH_2CH_2OCOCH=CH_2\ CH_3$$

in which $R_f$ is $C_4F_9$ or $C_8F_{17}$;

$$C_4F_9SO_2N\text{---}CH_2CH_2CH_2NSO_2C_4F_9$$
$$\quad\quad\ |\quad\quad\quad\quad\quad\quad\quad\quad\ |$$
$$\quad CH_2CH_2OCOC=CH_2\ CH_3$$
$$\quad\quad\quad\quad\quad\quad\quad |$$
$$\quad\quad\quad\quad\quad\quad\ CH_3$$

$$\quad\quad\quad\quad\quad\quad CH_3$$
$$\quad\quad\quad\quad\quad\quad\ |$$
$$C_4F_9SO_2NHCH_2CH_2NSO_2C_4F_9$$

$$C_4F_9SO_2N\text{-}CH_2CH_2NSO_2C_4F_9$$
$$\quad\quad\ |\quad\quad\quad\quad\quad\quad\ |$$
$$\quad\quad CH_2\quad\quad\quad\quad CH_3$$
$$\quad\quad\ |$$
$$\quad\quad CH_2$$
$$\quad\quad\ |$$
$$\quad\quad OH$$

$$C_4F_9SO_2N\text{-}CH_2CH_2NSO_2C_4F_9$$
$$\quad\quad\ |\quad\quad\quad\quad\quad\quad\ |$$
$$\quad\quad CH_2\quad\quad\quad\quad CH_3$$
$$\quad\quad\ |$$
$$\quad\quad CH_2$$
$$\quad\quad\ |$$
$$CH_2=CHOC\text{-}O$$

$$C_4F_9SO_2N\text{-}CH_2CH_2N\text{-}SO_2C_4F_9$$
$$\quad\quad\ |\quad\quad\quad\quad\quad\quad\ |$$
$$\quad\quad CH_2\quad\quad\quad\quad CH_3$$
$$\quad CH_3\ CH_2$$
$$\quad\ |\quad\ |$$
$$CH_2=C\text{-}CO\text{-}O$$

$$R_fSO_2NHCH_2CH_2NCH_2CH_2NHSO_2R_f$$
$$\quad\quad\quad\quad\quad\ |$$
$$\quad\quad\quad\quad\ SO_2C_4F_9$$

$R_f=C_4F_9$, $C_8F_{17}$, $C_4F_9CH_2CH_2$—

$$C_4F_9SO_2NCH_2CH_2\text{-}N\text{-}CH_2CH_2NSO_4C_4F_9$$
$$\quad\quad\ |\quad\quad\quad\quad\ |\quad\quad\quad\quad\quad\ |$$
$$\quad\quad CH_2\quad\quad SO_2C_4F_9\quad CH_2CH_2OH$$
$$\quad\quad\ |$$
$$\quad\quad CH_2OH$$

$$R_fSO_2N\text{-}CH_2CH_2N\text{---}CH_2CH_2NSO_2R_f$$
$$\quad\quad\ |\quad\quad\quad\quad\ |\quad\quad\quad\quad\quad\quad\ |$$
$$\quad CH_2CH_2O\ SO_2C_4F_9\ CH_2CH_2O\text{-}COCH=CH_2$$
$$\quad\quad\ |$$
$$\quad\quad COCH=CH_2$$

in which $R_f$ is $C_4F_9$ or $C_8F_{17}$;

$$C_4F_9SO_2N\text{---}CH_2CH_2N\text{-}CH_2CH_2NSO_2C_4F_9$$
$$\quad\quad\ |\quad\quad\quad\quad\quad\ |\quad\quad\quad\quad\quad\quad\ |$$
$$\ CH_2CH_2OCOC=CH_2\ SO_2C_4F_9\ CH_2CH_2O\text{-}COC=CH_2$$
$$\quad\quad\ |\quad\quad\quad\quad\quad\quad\quad\quad\quad\quad\quad\quad\ |$$
$$\quad\quad CH_3\quad\quad\quad\quad\quad\quad\quad\quad\quad\quad CH_3$$

$$C_4F_9SO_2NH\text{-}(CH_2)_6\text{-}NHSO_2C_4F_9$$

$$R_fSO_2N\text{-}CH_2CH_2CH_2CH_2CH_2CH_2NSO_2R_f$$
$$\quad\quad\ |\quad\quad\quad\quad\quad\quad\quad\quad\quad\quad\quad\ |$$
$$\ CH_2CH_2OCOCH=CH_2\ CH_2CH_2OCOCH=CH_2$$

in which $R_f$ is $C_4F_9$, $C_8F_{17}$, $C_{10}F_{21}$ or $C_{12}F_{25}$;

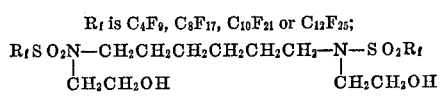

in which $R_f$ is $C_4F_9$ or $C_8F_{12}$; and

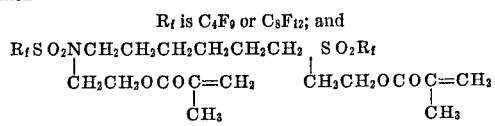

in which $R_f$ is $C_4F_9$, $C_8F_{17}$ or $C_8F_{17}CH_2CH_2$—.

7. Perfluoroalkanesulfonamide of Claim 1 of the formula $C_4F_9SO_2NHCH_2CH_2NHSO_2C_4F_9$.

8. Perfluoroalkanesulfonamide of Claim 1 of the formula $C_4F_9SO_2N(CH_3)CH_2CH_2N(CH_3)SO_2C_4F_9$.

9. Perfluoroalkanesulfonamide of Claim 1 of the formula $C_4F_9SO_2NH(CH_2)_6NHSO_2C_4F_9$.

10. Perfluoroalkanesulfonamide of Claim 1 of the formula

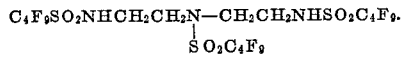

11. Perfluoroalkanesulfonamide of Claim 1 of the formula

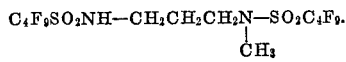

12. Perfluoroalkanesulfonamide of Claim 1 of the formula $C_8F_{17}SO_2NHCH_2CH_2NHSO_2C_8F^{17}$.

13. Perfluoroalkanesulfonamide of Claim 1 of the formula

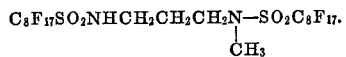

14. Perfluoroalkanesulfonamide of Claim 1 of the formula

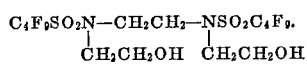

15. Perfluoroalkanesulfonamide of Claim 1 of the formula

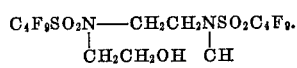

16. Perfluoroalkanesulfonamide of Claim 1 of the formula

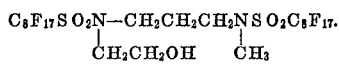

17. Perfluoroalkanesulfonamide of Claim 1 of the formula

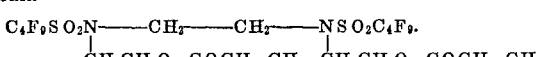

18. Perfluoroalkanesulfonamide of Claim 1 of the formula

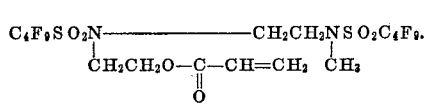

19. Perfluoroalkanesulfonamide of Claim 1 of the formula

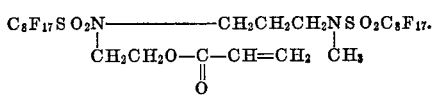

20. Perfluoroalkanesulfonamide of Claim 1 of the formula

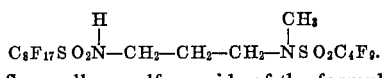

21. Perfluoroalkanesulfonamide of the formula

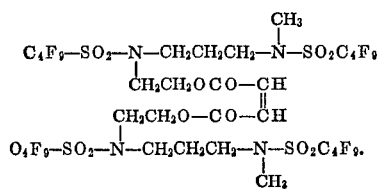

References Cited

UNITED STATES PATENTS

| | | | |
|---|---|---|---|
| 2,759,019 | 8/1956 | Brown et al. | 260—556 F |
| 2,803,656 | 8/1957 | Ahlbrecht et al. | 260—556 F |

S. D. WINTERS, Assistant Examiner

U.S. Cl. X.R.

260—486 R, 556 F, 465.5 R, 543 F, 543 R, 583 P; 252—8.75